United States Patent
Dezutter et al.

(10) Patent No.: US 6,811,879 B2
(45) Date of Patent: Nov. 2, 2004

(54) FLOWABLE AND METERABLE DENSIFIED FIBER FLAKE

(75) Inventors: Ramon C. Dezutter, Milton, WA (US); Brian Wester, Sumner, WA (US); Robert A. Veleber, Seatac, WA (US); Michael R. Hansen, Seattle, WA (US)

(73) Assignee: Weyerhaeuser Company, Federal Way, WA (US)

( * ) Notice: Subject to any disclaimer, the term of this patent is extended or adjusted under 35 U.S.C. 154(b) by 97 days.

(21) Appl. No.: 10/233,252

(22) Filed: Aug. 30, 2002

(65) Prior Publication Data

US 2004/0043217 A1 Mar. 4, 2004

(51) Int. Cl.[7] .................................................. B32B 5/16
(52) U.S. Cl. .................. 428/402; 428/532; 428/535; 428/536; 428/537.1
(58) Field of Search .................. 428/402, 532, 428/535, 536, 537.1

(56) References Cited

U.S. PATENT DOCUMENTS

| | | |
|---|---|---|
| 4,029,543 A | 6/1977 | Lindahl |
| 4,036,679 A | 7/1977 | Back et al. |
| 4,043,049 A | 8/1977 | Hedstrom |
| 4,548,675 A * | 10/1985 | Gordy .......................... 162/26 |
| 4,726,880 A | 2/1988 | Smith |
| 5,225,047 A * | 7/1993 | Graef et al. .................... 162/9 |
| 5,407,139 A | 4/1995 | Mleczewski |
| 5,897,701 A * | 4/1999 | Soroushian et al. ......... 106/711 |
| 5,931,610 A | 8/1999 | Rixom et al. |
| 6,345,777 B1 | 2/2002 | Leaver |
| 6,364,224 B1 | 4/2002 | Pearce |
| 6,372,094 B1 | 4/2002 | Heikkilä et al. |
| 2002/0112827 A1 | 8/2002 | Merkley et al. |

FOREIGN PATENT DOCUMENTS

DE  100 09 152 A1  11/2001

* cited by examiner

Primary Examiner—Leszek B Kiliman
(74) Attorney, Agent, or Firm—Christensen O'Connor Johnson Kindness PLLC

(57) ABSTRACT

The present invention is directed to a new form of pulp that is a flake having a specific size, density, and wet dispersibility. The flakes are easy to meter in specified quantities when adding to cementitious products, because bulk quantities of the flakes flow well in conduits and other enclosed containers. The pulp flakes can supply sufficient cellulose fiber to an extrusion process due to the flakes' high fiber density. The pulp flakes have a wet dispersability that is comparable to some pulp sheets that have not been hammermilled. In one embodiment of the invention, a pulp flake is provided that has a wet dispersion of from about 60 to about 240 counts as measured by a standard British disintegrator. Another embodiment of a pulp flake has a density of from about 0.3 to about 0.7 g/cc. In one embodiment, the pulp flake has a size of from about 3 to about 5 mm$^3$.

14 Claims, 1 Drawing Sheet

FLOWABLE AND METERABLE DENSIFIED FIBER FLAKE

FIELD OF THE INVENTION

The present invention is directed to a process for making a meterable and flowable form of cellulose, and the product made therefrom. The product is a flake and is used in cementitious compositions that require cellulose fibers to be mixed therein.

BACKGROUND OF THE INVENTION

One of the many uses of cellulose fibers is as a reinforcing material in cementitious products, such as those containing concrete, chalk, asphalt, bitumen, plaster, cement, gypsum, mortar, and the like. Cellulose fibers for use in these materials are typically supplied from commercially available market pulp sheets. Some pulp sheets are rolls of lightly pressed fluff pulp sheets. Other market pulp is papergrade, which is a more tightly pressed sheet. In order for cellulose fibers from a pulp sheet to be more fully assimilated within the cementitious product, the sheets must first be broken up with the use of a mechanical device, typically a hammermill, that fiberizes the sheet into singulated pulp fibers. The pulp fibers are then added to the product. Sometimes the market pulp sheet is diced and the diced pulp sheet is added. Papergrade pulp sheet being more densified than fluff pulp sheet, consequently is more difficult to disperse (has longer dispersion time) in wet media than fluff pulp sheet. In attempts to improve the dispersibility, either type of pulp sheet can be hammermilled or diced. However, once singulated into individual fibers, the fibers are considered to be undesirable because of their inability to be metered. Some pulp sheets, especially of the fluff type, are more readily dispersible. Sheets, however, are incapable of flowing in conduits and are too large to be metered in precise quantities for cementitious products. Dicing pulp sheet is also undesirable, since dicing, like hammernilling, requires additional processing prior to dispersing the fibers. Dicing also leads to localized highly densified areas or "edge effects" at the shear points that reduces the capacity of those densified areas of the fibers to disperse. The disadvantages of pulp sheet makes finding a new form of cellulose having none of the aforementioned drawbacks more urgent. U.S. Pat. Nos. 5,407,139 and 6,345,777 describe mechanically refiberizing cellulose products prior to their application in asphalt and cement. Refiberizing the cellulose materials immediately prior to application adds unwanted complexity and cost to the structures built from these materials. U.S. Pat. No. 5,931,610 describes a method for mechanically breaking up clumps of synthetic fibers. German publication *Offenlegungsschrift* DE 100 09152A1 describes making dense cellulose and synthetic fiber pellets.

It would be advantageous to provide a fibrous cellulose product that does not require mechanical fiberizing of the fiber source once dried. Ideally, such product would be easier to meter much better than singulated fibers. It is also desirable that the new fibrous product have a wet dispersability comparable to the presently available pulp sheets, but that avoids the need for hammermilling. The present invention fulfills these needs and provides further related advantages.

SUMMARY OF THE INVENTION

One embodiment of the present invention is directed to a new form of pulp: a flake having a specific size, density, and wet dispersibility. The flakes are easy to meter in specified quantities when adding to cementitious products, because bulk quantities of the flakes flow well in conduits and other enclosed containers. The pulp flakes can supply cellulose fiber sufficient to an extrusion or high consistency mixing process due to the flake's high density relative to hammermilled pulp. The pulp flakes have a wet dispersability that is comparable to some pulp sheets that have not been hammermilled.

In one embodiment of the invention, a pulp flake is provided that has a wet dispersion of from about 60 to about 240 counts as measured by a standard British disintegrator. Another embodiment of a pulp flake has a density of about 0.3 to about 0.7 g/cc. In one embodiment of the invention, an adjuvant is added to the pulp flake. The adjuvant can be a coupling agent, silicate, zeolite, latex, crosslinker, dye, debonder, surfactant, dispersant, clay, carbonate, biocide, antimicrobial, flame retardant, preservative, synthetic fiber, glass fiber, carbon fiber, or any other natural fiber. In one embodiment, the pulp flake has a wet dispersion measure of about 60 to about 90 counts when treated with a debonder. The pulp flake has a size of about 3–5 $mm^3$. The density of the pulp flake is about 0.3 g/cc, but can be as high as about 0.7 g/cc.

In another embodiment of the invention, a process for making singulated pulp flakes is provided. The process includes dewatering liquid pulp stock to a consistency of about 30 to about 50% solids. The process includes initial flaking to break up the dewatered pulp bundles into semi-uniform flakes having a median size of from about 3 to about 5 $mm^3$ and a consistency of from about 33 to about 55% solids. The process includes drying the flaked pulp to a consistency of from about 85 to about 97% solids. The process includes flaking a second time to separate the flakes that may have bonded during drying. The product "singulated" flakes then go to a baler for packaging. In another embodiment, the process includes blending the liquid pulp stock with at least one adjuvant prior to dewatering.

In another embodiment, a cementitious product is provided. The cementitious product includes cellulose fibers from pulp flakes. The pulp flakes have a dispersion measure of 60–240 counts prior to addition to a precursor composition that forms the cementitious product.

Pulp flakes made according to the invention do not require refiberizing prior to their addition to cementitious products due to their high dispersibility. Pulp flakes made according to the invention can be metered more readily than hammermilled fluff pulp because of their size and density. The pulp flakes of the present invention can be dispersed more readily than most diced pulp sheets because of their lower density and lack of cut edges.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Figure 1:
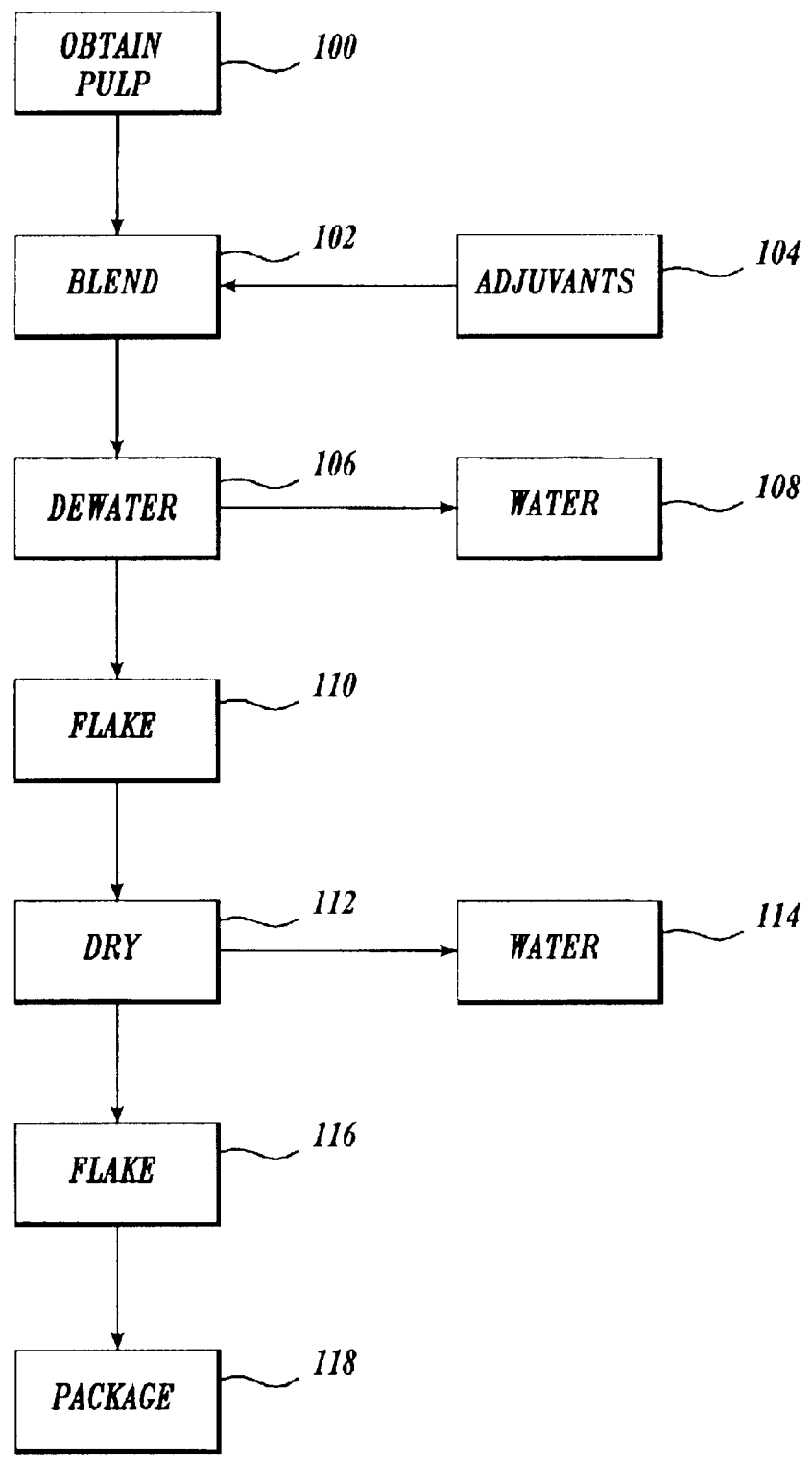
FIG. 1 is a flow diagram illustrating a representative process for making a pulp flake according to the present invention.

The present invention provides a meterable and flowable form of a cellulose product that is a flake and that is particularly useful in cementitious products for supplying reinforcing cellulose fibers without the need to hammermill or have a separate process step to refiberize. As used herein, "cementitious" refers to any pliable composition that hardens into a durable material. The meterable and flowable pulp flake has a wet dispersability that is comparable to some conventional market pulp sheets. However, because the product is a flake, the product can flow and be metered, unlike pulp sheets or rolls. As used herein, the properties "meterable" and "flowable" refer to the ability of the pulp flake, which in bulk quantities has fluid characteristics allowing flakes to flow through conduits in a manner that allows metering of specified quantities. The meterable and flowable pulp flake preferably has a density of at least 0.3 g/cc, but may be as high as about 0.7 g/cc. The meterable and flowable pulp flake has a wet dispersibility measure of from about 60 to about 240 counts using a standard British disintegrator. The meterable and flowable pulp flake also can be made from combinations of pulp with other adjuvants. Due to its wet dispersibility, the meterable and flowable pulp flake eliminates the need to refiberize the dried product with a separate mechanical device prior to its addition to cementitious compositions.

One embodiment of a system to make meterable and flowable pulp flakes includes a blend chest, a dewatering unit, a first and second flaking unit, and a dryer unit. These unit operations are in flow communication with one another to process liquid pulp stock or slurry into the pulp flakes as set forth below.

Referring now to FIG. 1, one embodiment of a process for making a meterable and flowable pulp flake that has a high wet dispersability, high density, and small size is schematically illustrated. In block 100, a step in the process is obtaining a suitable liquid pulp stock or wet slurry for converting into the pulp flakes of the present invention. The pulp stock or slurry can be any bleached or unbleached pulp liquid stock or slurry. Preferably, the pulp that is obtained in block 100 is a never-dried pulp. In one embodiment, preferably a bleached Kraft pulp stock or slurry is used. Another embodiment of the invention uses the low chemical oxygen demand (COD) pulp described in U.S. patent application Ser. No. 10/330,529, titled VERY LOW COD UNBLEACHED PULP, filed on Dec. 26, 2002, the application is herein expressly incorporated by reference in its entirety. Another embodiment uses a market pulp sold under the name TYEE KRAFT by the Weyerhaeuser Company of Federal Way, Washington. TYEE KRAFT pulp is a bleached softwood Kraft pulp made from sawdust. However, a wide variety of pulps containing cellulosic fibers can be used. Any Kraft, sulphite, soda, or alkaline cooking process is considered suitable in obtaining a pulp for use in the present invention. Suitable pulps for use in the invention can also be obtained from mechanical pulping processes such as thermomechanical pulp (TMP), chemithermomechanical pulp (CTMP), refiner mechanical pulp (RMP), and stone groundwood. The cellulose fibers of the pulp can be derived from any wood and/or non-wood source. In some embodiments, the cellulose may be derived from recycled fiber sources, such as old corrugated containers (OCC), and old news print (ONP). Of all the cellulose fiber sources, wood pulp is the most preferred because of its availability and price.

Natural sources of cellulose fibers include softwood species, including southern pine, Douglas fir, spruce, hemlock, and Radiata pine. In addition to these softwood fiber sources, pulps can also be produced from hardwood species, including eucalyptus, maple, birch, aspen, or mixed hardwoods. In contrast to wood, non-wood cellulosic fiber sources can be used, including straw, flax, hemp, jute, bagasse, sisal, and kenaf, or similar materials. Like wood-based fibers, these non-wood fiber sources may also be pulped and subsequently used to provide the pulp that will be converted into the meterable and flowable pulp flakes of the present invention.

The process of the invention may be practiced in a mill that produces the pulp stock. The pulp may be taken directly from the bleach plant storage tanks, unbleached pulp storage, other pulp mill sources or recycled fiber sources. Alternatively, the pulp of block 100 may be purchased on the market and shipped or otherwise conveyed to a plant that carries out the process of the invention. In any event, once a suitable liquid pulp stock or slurry is obtained, the pulp can be blended in the blend unit, block 102, with any desirable adjuvants depicted as originating from block 104. Alternatively, in one embodiment, the addition of adjuvants may be omitted. In this case, the process may go to the dewatering unit, block 106 without blending. Blending may still be performed when no adjuvants are added to improve the fiber concentration or as desired according to the type or types of fibers that are being used. In another embodiment, the dewatering unit, block 106, may be omitted if the pulp obtained in block 100 is already of suitable consistency. In one embodiment, the blend unit of block 102 is a blend chest. A "blend chest" refers to any suitable device capable of mixing pulp obtained from a mill with adjuvants such as other fibers, natural or synthetic, and/or any chermical treatments. Suitable adjuvants include coupling agents, silicates, zeolites, latices, crosslinkers, debonders, surfactants, dispersants, clays, carbonates, biocides, dyes, antimicrobial compositions, flame retardants, preservatives, synthetic fibers (such as polypropylene, polyester, polyamide, rayon, lyocell), glass fibers, carbon fibers, and any other natural fibers (such as wool and silk, and different species of wood or non-wood fibers such as hardwood, softwood, OCC, ONP, cotton, straw, flax, hemp, jute, bagasse, sisal, and kenaf and similar materials). Coupling agents are used, for example, to better bond the fibers to a matrix. Other examples of suitable adjuvants are described on pages 194–206 of the *Handbook of Pulping and Papermaking*, 2d ed., by Christopher J. Biermann (Biermann), these pages are incorporated herein by reference in their entirety. Other adjuvants for pulp are described in U.S. application Ser. No. 10/187,213, filed on Jun. 28, 2002, now U.S. Pat. No. 6,769,199 the disclosure of which is incorporated herein by reference in its entirety.

The pulp from the blend unit, block 102, is transferred to a dewatering unit (e.g., screw press), depicted as block 106. The unit dewaters the pulp to a much higher consistency. In one embodiment, the consistency of the pulp leaving the dewatering unit, block 106, is from about 30 to about 50% solids. The white water ejected from the unit leaves the process as depicted in block 108. Any suitable device capable of increasing the consistency of wet pulp can be employed in the process according to the invention. In a preferred embodiment, the dewatering unit is a screw press. In addition to one or more screw press units, a belt press, continuous centrifuge, batch centrifuge, double roll press, Fourdrinier wire, or any other suitable dewatering device may be employed.

From the dewatering unit, block 106, the pulp enters a first flaking unit depicted as block 110. The first flaking apparatus breaks up the dewatered pulp bundles into semi-uniform flakes having a median size of from about 3 to about 5 $mm^3$. As used herein "flake" refers to any particle, pellet, granule, or individual form that is made up of aggregated cellulose fibers. In contrast to pulp sheets, flakes are smaller and can flow and be metered much like a fluid when in bulk form. Hammermilled fluff pulp is considered to be undesirable due to its inability to be metered because of its singulated fiber nature. Papergrade sheet pulp or any pulp sheet is not even flowable at all. Moreover, unlike pulp sheets, the flakes of the invention do not need to be further reduced in size once dried before being added into continuous or batch extruders, mixers, or high consistency mixers such as those used for extrusion and cementitious compositions. Pulp sheets can be diced. However, the apparatus required to do this adds complexity to the process. Dicing also creates dense areas at the shear points of the diced materials leading to more difficult fiber dispersion of those areas of the fibers. The flakes of the invention readily disperse to provide dispersed fibers. Suitable flaking apparatus include pin fluffers, buster fans, and/or turbulent air methods. By the time the pulp flakes leave the first flaking unit, block 110, the consistency of the pulp flakes is from about 33 to about 55% solids.

The pulp flakes from the first flaker are then sent to a dryer unit, such as a continuous rotary drum dryer, depicted as block 112. Depending on the size and the temperature of the dryer, the residence time for the flake in the dryer will vary. Drying times and temperatures will also vary depending upon the requirements of the different adjuvants that may be present. Compositions containing meltable or heat sensitive materials will need to be dried at low temperatures for a longer time. In one embodiment, the temperature of the dryer is about 105° C. Compositions of less sensitive materials will typically be dried at higher temperatures (e.g., 140–170° C.) for longer times to increase through-put. The dryer removes additional moisture from the pulp flakes, depicted as water leaving the process in block 114. In one embodiment, the consistency of the pulp flakes leaving the dryer is from about 85 to about 97% solids. In one embodiment of the pulp flakes, a consistency of about 90% solids is preferred. It is to be appreciated that once the pulp flakes are exposed to the ambient atmosphere, the moisture content of the pulp flakes will vary depending on the atmospheric conditions. The moisture content of the pulp flakes will be mostly influenced by the relative humidity.

From the dryer unit, block 112, the pulp flakes enter a second flaking apparatus, block 116. The first flaking unit breaks up the initially dewatered pulp bundles into semi-uniform flakes, the second flaking unit separates the pulp flakes that have bonded during the drying step, without any further appreciable reduction in the median flake size. The pulp flakes leaving the second flaking apparatus are of similar size to those leaving the first flaking apparatus. Suitable devices for use as the second flaking unit include pin fluffers and buster fans. In general, any apparatus that uses low energy and does not substantially further diminish the median flake size is suitable to use as the second flaking unit. After leaving the second flaking unit, the pulp flakes are in a substantially singulated form. A singulated flake is a discreet agglomeration of fibers, substantially unbonded to other agglomerates, having a characteristic size, density and dispersibility. These characteristics are thought to give the flakes their ability to flow, be metered, and be suitable for use in cementitious compositions without having to mechanically fiberize the pulp flakes into fibers before addition.

From the second flaking unit, block 116, the pulp flakes are directed to a packaging unit, such as a vertical baler for packaging in bags or sacks, depicted as block 118. The pulp flakes may be densified for packaging as long as the pulp flakes remain as singulated flakes. However, any other suitable packaging method can be used.

The process of the present invention produces a new form of a cellulose product that is a flake having advantageous characteristics. The pulp flake product is useful, for example, in any extrusion process where it is desirable to have a cellulose fiber source that is both meterable and flowable and is sufficiently dense to supply the desired amount of cellulose fiber to the extrusion process and has suitable fiber dispersion qualities.

The flaked pulp product made according to the invention also has a wet dispersibility that is greater than flash-dried papergrade pulp and comparable to most other treated or untreated pulp that has been diced, or comes in a sheet. Dispersibility is a measure of a fiber source's ability to be distributed within a medium as individual pulp fibers. The wet dispersibility measure of the product of the invention ranges from about 60 to about 240 counts using a standard British disintegrator and measured according to the procedure described below. If a debonder is used in the blend unit, block 102, the wet dispersibility of the pulp flakes is from about 60 to about 90 counts. Suitable debonders include surfactants, such as BEROCELL 587K, manufactured by Akzo Nobel, Eka Chemicals, added in amounts of up to 1% by weight on a dry fiber basis. BEROCELL 587K has as its constituents cationic and non-ionic surfactants. Specifically, BEROCELL 587K has about 5% to 10% alkylbenzyldimethyl ammonium chloride and about 60% to 80% fatty alcohol ethoxylate. Therefore, in one embodiment, the pulp flake may include any suitable quaternary ammonium compounds in amounts of about 0.1% by weight. Amounts of nonsurfactant debonders are at most 15% by weight of the pulp flake.

The procedure for measuring the wet dispersibility of pulp is as follows:
  1. Weigh 1 gram (+/−0.01) of air dry fiber (~7% moisture) using an analytical balance.

2. Add the fiber to a standard British disintegrator (in the example below, the disintegrator used is a Standard Pulp Disintegrator, Mark III, type C).

For this particular model, each unit on the counter corresponds to 25 revolutions of the propeller; therefore, 600 counts are the equivalent of 15,000 revolutions. At 3000 rpm this results in a disintegration time of 5 minutes.

3. Add 2 liters (+/−100 ml) of room temperature (20+/−5° C.) deionized water to the disintegrator jar.
4. Place the jar in the disintegrator chassis and set the counter to 30. One minute of disintegration time equals 120 counts on the disintegrator.
5. Start the disintegrator.
6. After the allotted time and the disintegrator has stopped, pour the fiber slurry into a polypropylene tray (~45 cm×~33 cm×~12 cm) for knots counting. Use a black or brown tray for bleached fibers and a white tray for unbleached fibers. It may be necessary to agitate the slurry. Rock the tray back and forth five times being careful so as not to spill the slurry.
7. Count the knots present in the slurry. For purposes of this procedure, a knot is defined as a ball of fibers of any size. Shives (unrefined fiber bundles), bark, dirt, plastics and other foreign debris are not counted as knots. The use of a hand lens (10×) and tweezers are required for accurate determination. If macroscopic observation of a particle is required and it is determined to be a knot, place the knot back into the slurry. Particles other than knots should be discarded so as not to contaminate the slurry and the observation process.
8. If no knots are observed, record the number of counts and or time to disperse. This will be 30 counts (15 seconds).
9. If knots are present, follow the steps below.
   A. 30 count intervals.
      If knots exist (at least one), pour the slurry from the tray back into the disintegrator. Disintegrate the same sample for another 30 counts. Repeat this procedure to a total of 120 counts using 30 count intervals until no knots are observed. When no knots are observed, record to the nearest 30-count interval (15 seconds) when the zero knot level was attained.
   B. 120 count intervals.
      If after 120 counts of disintegration there is at least one knot, disintegrate for 120-count intervals up to a total of 600 counts.
      If the zero knot level is attained during this period, record the zero knot level to the nearest 120 counts (minute).
   C. 600 count intervals.
      If after 600 counts (5 minutes) of disintegration there is at least one knot, disintegrate for 600-count intervals up to a total count of 1800 (15 minutes).
      If the zero knot level is attained at or before 1800 counts, record to the nearest 600 counts (5 minutes). If at least one knot is present after 1800 counts, record the pulp dispersibility as greater than 1800 counts or greater than 15 minutes.

Reference may be made to the following standards: TAPPI T 205 sp-95 and ISO 5263:1995

Without intending to be bound by theory, the density and size are thought to be related to the pulp flakes' ability to be readily meterable and flowable and to disperse in a wet medium. The density of pulp flakes is at least about 0.3 g/cc, but can be as high as about 0.7 g/cc.

The following description pertains to the procedure used to determine the density of pulp. A dry fiber sample is weighed and recorded. This value is $W1$. The fiber sample is saturated with hexadecane (C16). The fiber sample is immersed in a small glass container containing the hexadecane and soaked for a minimum of three minutes. The saturated fiber sample is weighed and the weight is recorded. This value is $W2$. Any excess hexadecane is removed from the surface of the fibers using a tissue. The pore volume of the sample is calculated as follows:

$$\text{Pore volume} = WC16 \div \text{specific gravity of } C16;$$
$$= WC16 \div 0.7333$$
$$\text{where } WC16 = W2 - W1$$

The total volume is then calculated. This is the fiber volume plus the pore volume.

$$\text{The fiber volume} = W1 \div 1.55$$
$$\text{The total volume} = \text{fiber volume} + \text{pore volume}$$
$$\text{The density is} = W1 \div \text{the total volume}$$

In accordance with other aspects of the invention, the pulp flakes can be added into a pliable precursor composition of a cementitious product without first having to mechanically refiberize the dried pulp flake. In contrast to hammermilled fluff pulp sheets, the pulp flake product of the invention can be more precisely metered. Pulp sheets are not flowable or meterable at all. The pulp flake product is readily metered using a screw conveyor in more precise quantities, for example. Fluff pulp tends to have too much air space. The pulp flakes have a suitable wet dispersibility even when not mechanically refiberized. The pulp flakes are not sheets, but nevertheless have a comparable wet dispersion measure of most other treated or untreated pulp that has been diced or sheeted. The pulp flake produced in accordance with the present invention is suitable to be added to precursors of cementitious products at any desired weight percent. It is to be understood, that once in the cementitious composition, the pulp flakes lose their characteristic flake shape, disperse into the composition, and the flakes' component fibers are present in the composition as individualized pulp fibers. In extruded cement products, the weight percent of pulp flake product that is used is typically less than about 18% by weight on a dry ingredient basis, preferably in the range of from about 3 to about 9% by weight, also on a dry ingredient basis. In ready mix concrete, the weight percent of pulp flake product that is used is less than about 4%, but more preferably in the range of about 2 to about 3% by weight. In chalk, starch, and fiber products, the weight percent of pulp flake product that is used is less than about 30%, more preferably in the range of from about 8 to about 15% by weight, but still more preferably in the range of from about 10 to about 12% by weight. All weight percents are given on a dry ingredient basis. Once the cementitious product has set, the weight percent of cellulose fibers may be more or less than the ranges provided above due to hydration of some of the ingredients.

While the preferred embodiment of the invention has been illustrated and described, it will be appreciated that various changes can be made therein without departing from the spirit and scope of the invention.

COMPARATIVE EXAMPLE

The wet dispersion of several cellulose fiber sources as compared to treated and untreated pulp flakes of the invention is shown in Table 1 below. Treated refers to pulp flakes that include the debonding agent BEROCELL 587K. Treated hammermilled fluff pulp has a faster wet dispersion than the treated pulp flakes of the invention because hammermilled fibers are singulated. The treated pulp flake is comparable in wet dispersion to untreated hammermilled fluff pulp, treated or untreated fluff pulp sheets, treated diced fluff pulp, and untreated papergrade sheet pulp. The treated pulp flake has a faster wet dispersion than untreated diced fluff pulp, untreated hammermilled or sheet papergrade pulp, and untreated flash-dried papergrade pulp.

Treated hammermilled fluff pulp, untreated sheet pulp, and treated diced fluff pulp are faster in wet dispersion than the untreated pulp flakes. The untreated pulp flake is comparable in wet dispersion to untreated hammermilled fluff pulp, treated fluff sheet pulp, untreated diced fluff pulp, and untreated hammermilled, sheet, or diced papergrade pulp.

Untreated, Hammermilled
Kamloops KK-T (bleached softwood)**
Kamloops 791 (unbleached softwood)**
Papergrade, Sheets
Kamloops KK-T (bleached softwood)**
Kamloops 791 (unbleached softwood)**
Port Wentworth (bleached softwood)
Prince Albert Aspen (bleached softwood)**
Tasman Radiata (unbleached softwood)*
Crofton cedar (bleached softwood)*
Gulf States NBK (bleached softwood)*
Untreated, Diced
Kamploops KK-T (bleached softwood)**
Kamloops Sockeye (unbleached softwood)**
Papergrade, Flash Dried
Rainy Brite softwood (bleached softwood)
Rbur Scan NMK (bleached softwood)
Rottneros Bruk UBK (unbleached softwood)
Temcell HW (aspen hardwood CTMP)
Westvaco NMK (bleached softwood)*
*These are pulps produced by companies other than Weyehaeuser.
**These pulps produced by Weyerhaeuser.

TABLE 1

| | Wet Dispersion Measurement | | | | | |
|---|---|---|---|---|---|---|
| | Untreated | Treated | Hammer-milled | Sheet | Diced | Dispersion counts | Dispersion time |
| Columbus fluff | X | | X | | | 30–120 | 15 sec–1 min |
| New Bern fluff | | X | X | | | 30 | 15 sec |
| New Bern fluff | | X | | X | | 90 | 45 sec |
| Columbus fluff | X | | | X | | 30–60 | 15 sec–30 sec |
| Columbus fluff | X | | | | X | 120 | 1 min |
| Columbus fluff | | X | | | X | 60 | 30 sec |
| Papergrade | X | | X | | | 240–360 | 2 min–3 min |
| Papergrade | X | | | X | | 90–360 | 45 sec–3 min |
| Papergrade | X | | | | X | 240–1200 | 2 min–10 min |
| Papergrade flash-dried | X | | | | | 480–>1800 | 4 min–>15 min |
| Pulp flakes | | X | | | | 60–90 | 30 sec–45 sec |
| Pulp flakes | X | | | | | 90–240 | 45 sec–2 min |

The untreated pulp flake has a faster wet dispersion than untreated flash-dried papergrade pulp. "Comparable" when used to refer to the wet dispersion measure between pulps means that there is at least some dispersion count measurement that overlaps with the count measurement of another pulp.

In Table 1, Columbus fluff is a bleached, primarily southern pine fluff pulp manufactured by Weyerhaeuser at Columbus, Miss. New Bern fluff is a bleached, primarily southern pine fluff manufactured by Weyerhaeuser at New Bern, N.C. The remaining pulps are made at a variety of locations by various companies. For example, other pulps tested for dispersibility are:

The embodiments of the invention in which an exclusive property or privilege is claimed are defined as follows:

1. A pulp flake, having a wet dispersion measure of from about 60 to about 240 counts.

2. The pulp flake of claim 1, having a size of from about 3 to about 5 mm$^3$.

3. The pulp flake of claim 1, further comprising an adjuvant from at least one of coupling agents, silicates, zeolites, latices, crosslinkers, debonders, surfactants, dispersants, clays, carbonates, biocides, dyes, antimicrobials, flame retardants, preservatives, synthetic fibers, glass fibers, carbon fibers, and natural fibers.

4. The pulp flake of claim 3, wherein the synthetic fibers are at least one of polypropylene, polyester, polyamide, polyethylene, rayon, and lyocell.

5. The pulp flake of claim 3, wherein the natural fibers are at least one of hardwood, softwood, cotton, wool, silk, straw, flax, hemp, jute, bagasse, sisal, kenaf, recycled pulp, OCC, and ONP.

6. A pulp flake, comprising a debonder and having a wet dispersion measure of from about 60 to about 240 counts.

7. The pulp flake of claim 6, comprising at most about 15% debonder by weight.

8. The pulp flake of claim 6, having a wet dispersion measure of from about 60 to about 90 counts.

9. The pulp flake of claim 6, comprising at most about 0.1% by weight of a quaternary ammonium compound.

10. A dried pulp flake having a density of from about 0.3 to about 0.7 g/cc.

11. A pulp flake product that is characterized by a greater meterability as compared with hammermilled fluff pulp, and has a wet dispersibility that is at least comparable with diced, sheet or papergrade pulp, the pulp flake product not requiring mechanical fiberizing after it has been dried, before being added to any cementitious composition.

12. A cementitious product comprising cellulose fibers obtained from a pulp flake, the pulp flake having a wet dispersion measure of from about 60 to about 240 counts.

13. The cementitious product of claim 12, comprising at most about 18% by weight cellulose fibers on a dry ingredient basis.

14. The cementitious product of claim 12, wherein the cementitious product includes at least one of concrete, chalk, asphalt, bitumen, plaster, cement, gypsum, and mortar.

* * * * *